Figure 1:
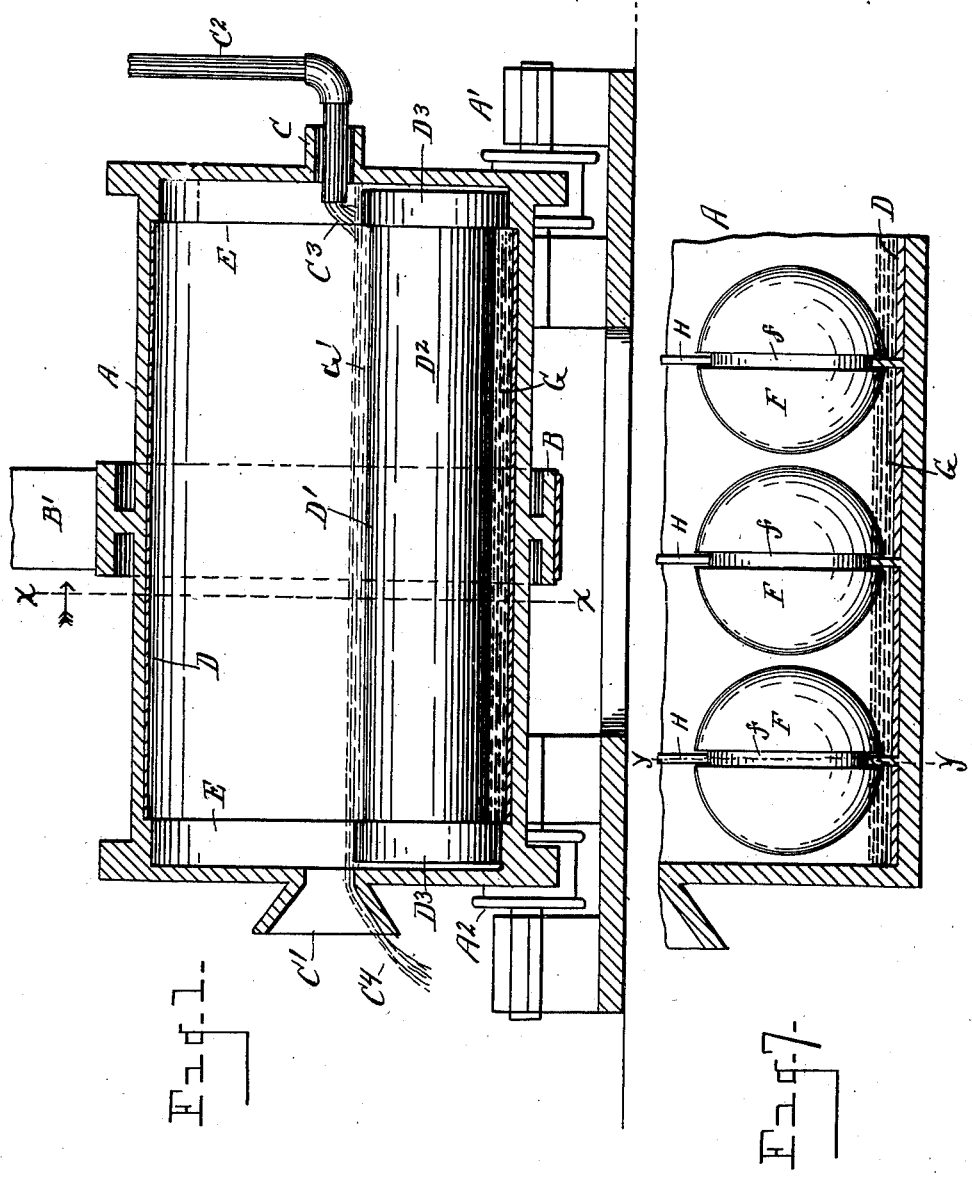

No. 660,774. Patented Oct. 30, 1900.
T. H. HICKS.
AMALGAMATOR.
(Application filed Mar. 23, 1900.)
(No Model.) 3 Sheets—Sheet 1.

WITNESSES.

INVENTOR.
Thomas H. Hicks
By Newell S. Wright
His Attorney

No. 660,774. Patented Oct. 30. 1900.
T. H. HICKS.
AMALGAMATOR.
(Application filed Mar. 23, 1900.)
(No Model.)
3 Sheets—Sheet 2.

WITNESSES.
INVENTOR.
Thomas H. Hicks
By Newell S. Wright
His Attorney

No. 660,774. Patented Oct. 30, 1900.
T. H. HICKS.
AMALGAMATOR.
(Application filed Mar. 23, 1900.)
(No Model.) 3 Sheets—Sheet 3.
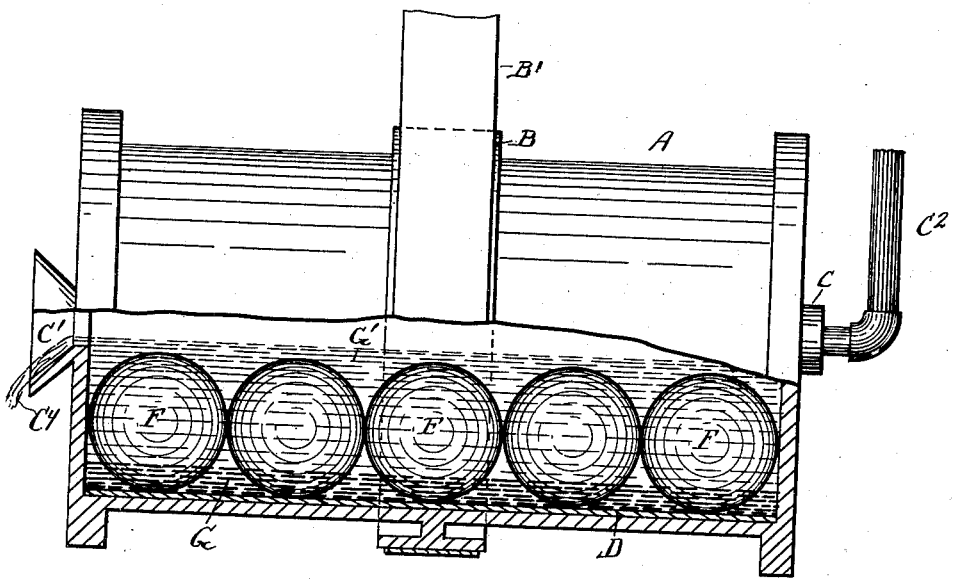
Fig. 4.
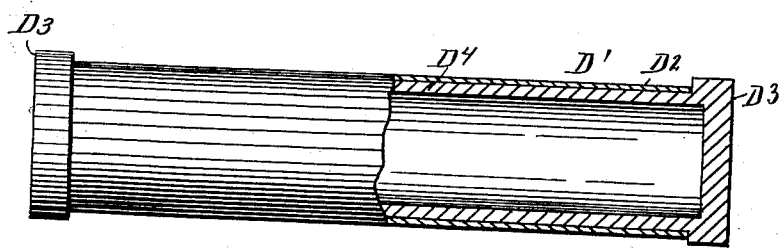
Fig. 3.
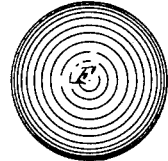
Fig. 5.
Fig. 6.
WITNESSES.
INVENTOR.
Thomas H. Hicks
By Newell S. Wright
His Attorney

UNITED STATES PATENT OFFICE.

THOMAS H. HICKS, OF FORT WAYNE, INDIANA.

AMALGAMATOR.

SPECIFICATION forming part of Letters Patent No. 660,774, dated October 30, 1900.

Application filed March 23, 1900. Serial No. 9,868. (No model.)

*To all whom it may concern:*

Be it known that I, THOMAS H. HICKS, a subject of the Queen of Great Britain, residing at Fort Wayne, county of Allen, State of Indiana, have invented a certain new and useful Improvement in Amalgamators for Extracting Amalgamable Metals from their Ores; and I declare the following to be a full, clear, and exact description of the invention, such as will enable others skilled in the art to which it appertains to make and use the same, reference being had to the accompanying drawings, which form a part of this specification.

This invention relates to new and useful improvements in amalgamators used in extracting amalgamable metals from their ores, such as gold, silver, and copper.

To this end my improvement consists in the construction, combination, arrangement, and operation of the parts whereby a very large and rotatable surface of amalgamating-plate can be more effectually applied or used in extracting the values from ores containing amalgamable metals.

The nature of my present invention is described in the following specification, and it is illustrated in the drawings hereto annexed, which form a part of this specification.

Figure 2:
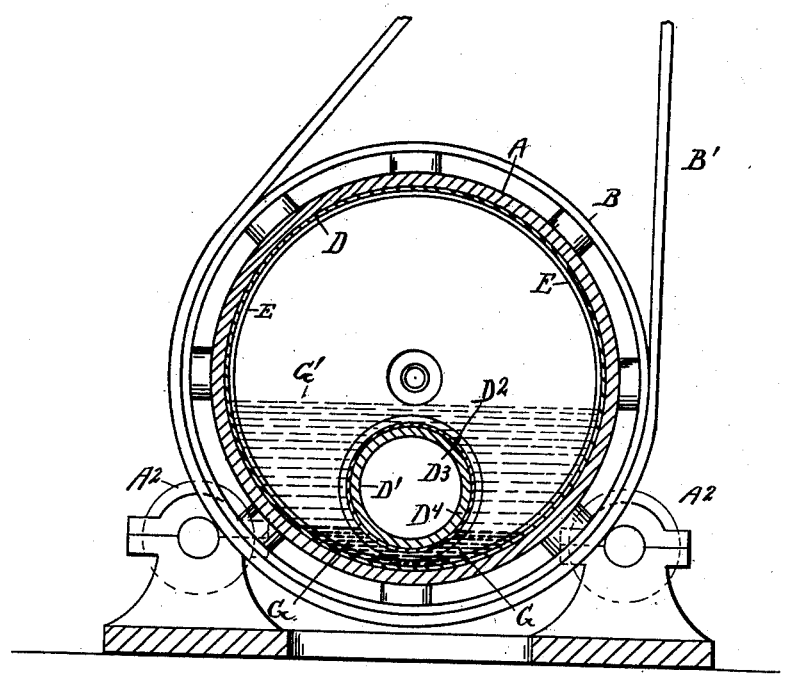
Figure 3:
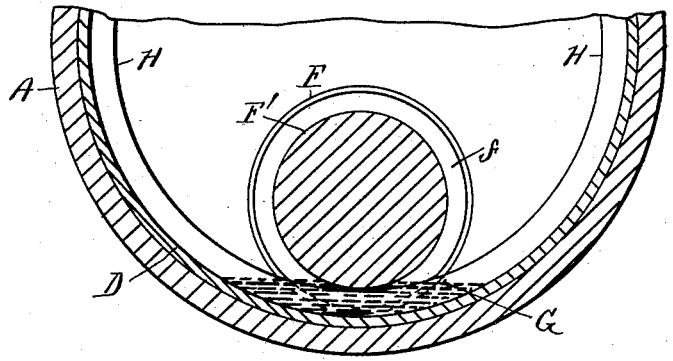

In the accompanying drawings, Figure 1 is a longitudinal vertical section showing parts in elevation. Fig. 2 is a sectional view in elevation on the dotted line $x\ x$, Fig. 1. Fig. 3 is a detail view, partly in section and partly in elevation, showing a rotatable agitating amalgamator, seen also in Figs. 1 and 2. Fig. 4 is an elevation partly in longitudinal section, showing a modification of my invention. Fig. 5 is a detail view of an agitating amalgamating-ball seen in the modification shown in Fig. 4. Fig. 6 is a sectional view of the amalgamating-ball seen in Fig. 5. Fig. 7 is a partial longitudinal section showing parts in elevation, illustrating a modification in the construction of rotatable amalgamating-balls included in my present invention; and Fig. 8 is a partial sectional view on the dotted line $y\ y$, Fig. 7.

In the drawings like letters of reference indicate like parts.

The essential features of my invention illustrated by the drawings are lettered and described as follows:

A is a rotatable cylindrical amalgamating-tank which may be caused to rotate in any suitable manner, as upon two sets of wheels $A'$ and $A^2$.

B is a pulley suitably secured to the tank A, and $B'$ is a driving-belt actuated by any suitable source of power for rotating the tank A.

C is an inlet open end of the tank A, and $C'$ is its outlet.

$C^2$ indicates a pipe for supplying the tank A with pulverized ore suitably mixed with water, so as to produce a flowable pulp, which is indicated at $C^3$, where it enters the tank A, and also indicated at $C^4$, where it leaves the tank after having had its values extracted in the tank.

D indicates a silvered-copper coating or lining of the tank A, and $D'$ indicates a rotatable iron cylinder covered with a silvered-copper surface or jacket $D^2$ and forms a cylindrical agitating-amalgamator.

$D^3\ D^3$ are annular treads upon the cylinder $D'$, so as to prevent the silvered-copper surface of the cylinder $D'$ from coming in contact with the inner surface of the tank A during its rotation, which would wear off its silvered surface.

$D^4$ in Figs. 2 and 3 indicates the iron part of the cylinder, upon which the silvered-copper surface or jacket $D'$ is arranged.

E E are annular projections upon the inner surface of the tank A, so that the annular treads of the cylinder $D'$ can roll or rotate upon them, and thus have two iron surfaces in contact with each other instead of two silvered-copper surfaces. The annular treads $D^3\ D^3$ and the annular projections E E cause the formation of a space between the amalgamating-surfaces of the two cylinders, and the space thus formed is filled with the mercury G, so that the rotating or rolling motion of the cylinder $D'$ will cause the ore-pulp to pass through the above-named space, which is filled with mercury, and thereby greatly assist in extracting the values from the ore.

F F are iron balls covered with silvered copper, which may be used as a substitute for the cylinder $D'$. In Fig. 6 both the iron and silvered-copper parts of one of these balls may be seen, F being the silvered-copper portion and F' the iron portion. The balls shown in Figs. 7 and 8, which are also covered with a film of silvered copper and representing a modification of the balls shown in Fig. 4, are cast so as to have an annular groove $f$ surrounding each ball, and the rotatable tank A has annular projections H upon the inner surface, one for each ball to rotate upon. These projections and annular grooves are for the purpose of guiding each ball during rotation and at the same time to keep the balls from riding on the silvered-copper surfaces.

G indicates mercury, and G' indicates the body of ore and water mixed together within the tank A, thereby forming ore-pulp.

Having thus referred to and described the various parts of my invention, I will now describe its operation and point out the manner in which new and valuable results are obtained in extracting amalgamable metals from their ores.

The process of amalgamation is as follows: Pulverized ore and water may either be caused to flow continuously into the tank A by the pipe $C^2$, as indicated at $C^3$, and continuously out of the tank at the opening C', as indicated at $C^4$, thereby representing what I call a "continuous" process of amalgamation, or the tank A may be first suitably filled with the ore-pulp, then treated so as to extract the values from the ore, and then emptied out of the tank, thereby representing a system for treating ore-pulp by distinct charges of the tank A. I consider the continuous process to be the better way to operate, because it will involve less labor in handling the ore, and the tank A in such a case need not be made so large in diameter, as it would not be required to hold so much ore-pulp at one time; but each system has its advantages in treating certain kinds of ores, very rebellious ores being better treated by distinct charges of ore-pulp. My intention is to use one of the rotating cylinders A to take the place of silvered-copper plates now in common use in ore stamp-mills, and in such a case the continuous process can be more suitably carried into effectiveness in carrying out my scheme.

In operating the amalgamating-tank A it is first to be set in rotation, as by the driving-belt B', and then ore-pulp is to be caused to flow in suitable quantity through the tank A during the rotation of the tank. The cylinder is to be so arranged that its silvered surface will dip into the mercury G, which has been previously put into the tank A, and thereby cause the silvered surfaces of the tank A and cylinder D' or balls F to be kept continuously coated with a fresh supply of mercury. The rotation of the tank A will also cause the cylinder D' to rotate, and the rotation of the cylinder D' will cause the ore-pulp to be drawn under the cylinder and through the mercury and at the same time the ore-pulp will be caused to slide over the surfaces of silvered copper, thus bringing the ore into contact with a very large amalgamating silvered-copper surface arranged upon the inner surface of the tank A and the outer surface of the cylinder D' or balls F. During the rotation of the amalgamating-tank A and amalgamating-cylinder D' or balls F all amalgamable metals contained in the ore will become extracted therefrom and deposited upon the silvered-copper surfaces of the tank A and cylinder D' or balls F; but the rotation and action of the ore will combine to detach some of the amalgam from the amalgamating-surfaces, which will be again recovered by the mercury G in the bottom of the tank A, and thus every particle of extracted metals from the ore will be saved by either the rotating amalgamating-surfaces described or by the mercury. The rubbing action of the ore-pulp against the amalgamating-surfaces will cause the silvered copper to be kept clean, so that fresh mercury will constantly and readily unite with the amalgamating-surfaces, which will in return cause the values from the ore to readily unite with the amalgamating-surfaces of silvered copper thus kept clean. My invention is therefore well adapted for application to ores containing what is known as "very fine" or "flour" gold, which in the present stamp-mill using stationary amalgamating-plates would float off and be lost. An essential feature for quick amalgamation lies in keeping the amalgamating-surfaces very clean and brightly coated with mercury, and the output capacity of an amalgamator depends upon the amount of amalgamating-surface that becomes exposed to the ore-pulp, and my present scheme is admirably adapted for carrying these essential features into effect. I prefer making these amalgamating-tanks about twenty-five feet long and four feet in diameter, so that their output capacity will range from twenty-five to one hundred tons of ore per day of twenty-four hours, which will depend upon the nature of the ore treated. The rotation of the amalgamator causes the ore to be constantly kept falling upon the amalgamating-surfaces of the tank A and cylinder D' or balls F, and the mercury G will thereby be caused to pass over the ore thus falling upon the amalgamating-surfaces continuously during rotation of the tank, which will greatly assist in extracting the values from the ore, and even the most rebellious ore can be successfully treated by my present invention, as described.

In the modification I show in Fig. 4 the rolling amalgamating-balls roll on the inner surface of the tank A, and, in this respect the action of the balls differs, in effect, from that of the rolling cylinder D', which does not touch the tank A except at its ends.

In treating sulfid ores the ball modification will operate more advantageously than the cylinder, for the reason that the balls will rub or grind the sulfurets during rotation of the tank A, which will brighten and clean the particles of metals contained in the ore, so as to make them more readily amalgamable, especially so in the case of roasted sulfurets, where the gold is housed up in spongy formations, which require to be broken up so as to liberate the gold and effect amalgamation therewith. Instead of using iron balls covered with silvered copper or of copper alone I can use brass or copper balls; but I prefer to use cast-iron balls electroplated with either copper or copper and silver, for they are much cheaper to make. When I use the ball modification shown, it is not necessary to line the tank A with copper, and, in fact, I prefer in such cases not to use the tank A as an amalgamating-surface, but to depend entirely upon the balls, for the reason that if the tank A were lined with copper the latter would wear in grooves by the rolling action of the balls, the copper being so soft; but when I use the modification shown in Figs. 7 and 8 then I prefer to use silvered copper applied to both the balls and the tank, for in this case the amalgamating-surfaces are not intended to come together any more than they are intended to do in the construction shown in Fig. 1.

The mercury G is intended to be drawn off at suitable intervals and retorted, so as to extract collected values contained therein, and the amalgamating-surfaces of the tank A and its contained rolling amalgamator can have any gold and silver that remains deposited thereupon scraped off in any suitable manner.

It will be readily understood by those skilled in the art of recovering gold and silver by amalgamation that my present invention enables me to produce a rolling self-cleaning amalgamator that will also keep the ore-pulp well agitated, and at the same time continuously keep the ore-pulp passing through the mercury by the rolling action of the cylinder D' or balls F, if used instead of the cylinder. Instead of using cylinders D', I could use solid castings; but I consider that solid castings would be too heavy for practical use. Also a number of cylinders D' could be arranged parallel one with another instead of using only one in a tank A, as I show, the feature of a rolling amalgamator being the essential characteristic of my scheme.

Having thus described my invention, what I therefore claim as new, and desire to secure by Letters Patent, is—

1. In an amalgamating apparatus, the combination with a rotatable tank having a metallic lining coated with mercury, of means for rotating said tank, a rolling amalgamator arranged within said tank and spaced therefrom and caused to be set in rolling motion by the rotation of said tank, and mercury arranged within the space between said rolling amalgamator and said tank to supply said lining and rolling amalgamator with mercury during the rotation of said tank, substantially as described.

2. In an amalgamating apparatus, the combination with a rotatable tank having a surface coated with mercury, of means for rotating said tank, a rolling amalgamator having a surface coated with mercury arranged within said tank and spaced therefrom intermediate of its ends and caused to be set in rolling motion by the rotation of said tank, said rolling amalgamator constructed with annular laterally-projecting treads to raise the rolling amalgamator from contact with the inner surface of the tank, substantially as described.

3. In an amalgamating apparatus, the combination with a rotatable tank, of means for rotating said tank, a rolling amalgamator arranged within said tank and having its surface coated with mercury, means for preventing said rolling amalgamator from having its amalgamating-surface come in contact with said tank, and a body of mercury placed in said tank, by which the amalgamating-surface of said rolling amalgamator is kept coated with mercury, substantially as described.

4. In an amalgamating apparatus, the combination of two rotatable cylinders, one of said cylinders arranged to rotate within the other, the inner surface of one of said cylinders and the outer surface of the other cylinder being composed of metal which has affinity for mercury, and a body of mercury arranged in the outer cylinder sufficient in quantity to permit a portion of the outer surface of the inner cylinder to dip therein, substantially as described.

5. In an amalgamating apparatus, the combination with two rotatable cylinders, one of said cylinders arranged to rotate within the other, and the outer surface of the inner cylinder, and the inner surface of the outer cylinder being formed of metal having an affinity for mercury, of a body of mercury arranged within said outer cylinder continually replenishing the amalgamating-surfaces of said cylinders with mercury during their rotation, and means for preventing the amalgamating-surfaces of said cylinders from rubbing together during their rotation, substantially as described.

6. In an amalgamating apparatus, the combination with two rotatable cylinders arranged to rotate one within the other, of means for forming a space between said cylinders, and having said space filled with mercury whereby the inner cylinder may dip therein during the rotation, substantially as described.

In testimony whereof I sign this specification in the presence of two witnesses.

THOMAS H. HICKS.

Witnesses:
N. S. WRIGHT,
M. HICKEY.